2,810,702
POLYVINYL FLUORIDE DISPERSIONS

Max Fredrick Bechtold, Kennett Square, Pa., and Manville Isager Bro, Wilmington, Del., assignors to E. I. du Pont de Nemours & Company, Wilmington, Del., a corporation of Delaware No Drawing. Application April 10, 1953, Serial No. 348,133

10 Claims. (Cl. 260—29.6)

This invention relates to new polymeric dispersions, more particularly, to polyvinyl fluoride dispersions.

The present techniques for making shaped polyvinyl fluoride structures such as fibers and films, involve polymer-melt or polymer-solution processes. For example, polyvinyl fluoride films are made either by hot-pressing or by hot-solution casting, generally from dimethylformamide solutions. All of these methods have the limitation that the desired combination of high solids content and high molecular weight polymer cannot be used because of the resulting excessively high solution viscosity, which interferes with the forming stage. Moreover, all of these processes involve isolation and drying of the polymer after its formation in aqueous medium, as opposed to the direct use of polymer dispersions. A further disadvantage with the solution processes is that the solution must be prepared and spun or cast while hot, i. e., at temperatures in the neighborhood or in excess of 130° C., with the accompanying risk of polymer degradation and discoloration.

An object of the present invention is to provide a new polyvinyl fluoride dispersion. A more particular object is to provide a new aqueous dispersion of polyvinyl fluoride which can be prepared without the necessity of drying the polyvinyl fluoride after polymerization in aqueous medium and which eliminates or substantially lessens the disadvantages inherent in the polymer-melt and polymer-solution processes of preparing shaped polyvinyl fluoride structures. Other objects will be apparent from the description of the invention given hereinafter.

The above objects are accomplished according to the present invention by providing an aqueous polyvinyl fluoride dispersion essentially comprising clusters of polyvinyl fluoride particles, the average diameter of the clusters being at least twice the average diameter of the primary particles, dispersed in an aqueous liquid medium containing at least 100%, by weight of the polyvinyl fluoride, of a water-soluble organic liquid which is a non-solvent for polyvinyl fluoride below 100° C. but a solvent therefor at higher temperatures, the organic liquid being present in amount at least equal to one-half the weight of the water.

In a more specific, preferred embodiment, the present invention comprises an aqueous polyvinyl fluoride dispersion containing 5% to 30% preferably, 8% to 20%, by weight of the dispersion, of polyvinyl fluoride in the form of clusters of polyvinyl fluoride particles wherein the average diameter of the clusters is in the approximate range of 0.4 to 20 microns, more preferably, 1 to 10 microns when the average diameter of the primary particles is in the range of 0.1 to 0.2 microns, with the clusters containing an average of at least 4 primary particles per cluster and, more preferably, at least 6 primary particles per cluster. Further, the dispersion preferably contains the water-soluble organic liquid in an amount equal to 1 to 12 times the weight of polyvinyl fluoride and, more preferably, in an amount equal to 3 to 6 times the weight of polyvinyl fluoride and 0.5 to 1.5 times the weight of water in the dispersion.

The favorable properties of the dispersions of this invention as regards formation of coherent structures are associated with the presence of clusters, which are particles of polyvinyl fluoride apparently agglutinated with some of the dispersion medium, rather than individual polymer particles. Substantially all, i. e., at least 95% of the polymer particles are present as such clusters, that is, less than 5% and generally less than 1%, of the polymer is present as non-clustered, primary particles. It has been found that the best results are achieved when the clusters are between 0.4 and 20 microns in diameter, and preferably have a diameter in the range of 1 to 10 microns when the primary particles are from 0.1 to 0.2 micron in diameter. In general, the diameter of the cluster is at least twice that of the primary particle and the clusters contain at least 4 primary particles, and, preferably, at least 6 primary particles. These dimensions of the clusters can be observed in dark field microscope views, with or without television projection thereof, of the polyvinyl fluoride dispersions, or they can be determined by angular dependence light scattering measurements. It appears that, when polyvinyl fluoride particles are organized into clusters of this size, they are properly immobilized for coalescence into coherent homogeneous structures upon removal of the dispersing medium, through the intermediate action of temperature-activated polymer solvents. The immobilization of the primary particles can be detected by the fact that they no longer possess Brownian motion and are associated with several of their neighbors.

Coalescible polyvinyl fluoride dispersions of the type described can be prepared in various ways, but in all cases their preparation involves bringing into intimate contact aqueous dispersions of polyvinyl fluoride particles of the usual size, e. g., between about 0.05 and 0.5 micron, obtained by known methods, with a water-soluble organic liquid which has no appreciable solvent action for polyvinyl fluoride at temperatures below about 100° C. but shows solvent action for it at higher temperatures. For the sake of brevity, organic liquids having this particular solvent power on polyvinyl fluoride will be referred to herein as "latent solvents."

The coalescible dispersions of this invention may be composed only of polyvinyl fluoride, water and one or more latent solvents. For example, they may, and advantageously do, consist of the aqueous system in which the monomeric vinyl fluoride was polymerized, and to which has been added a suitable amount of latent solvent. However, these dispersions may also contain minor amounts, e. g., up to 10% by weight of the total composition, of extraneous substances such as dispersing agent, residual polymerization initiator, added non-solvent, dyes, pigments, and the like. In any case, however, it is important that the dispersion contain at least 100% of latent solvent based on the weight of polyvinyl fluoride present, that is, at least an equal weight of latent solvent relative to the polyvinyl fluoride. Preferably, there should be present in the dispersion a quantity of latent solvent equal to 1 to 12 times, and, still more preferably, 3 to 6 times, the weight of polyvinyl fluoride present. Moreover, it is desirable that the weight ratio of the latent solvent to the water be at least 0.5, preferably between 0.5 and 1.5.

It is usually desirable in order to attain the coalescible dispersions of clustered particles of this invention, that they contain a small amount, e. g., between 0.01% and 3% by weight of the total dispersion, of an electrolyte which is preferably an ammonium or alkali metal salt of an acid having a dissociation constant above about $1 \times 10^{-7}$. Examples of suitable electrolytes include ammonium acetate, ammonium carbonate, potassium acetate, sodium sulfate, potassium chloride, ammonium phosphate, sodium oxalate, etc. Suitable clustering action can in some instance be induced by addition of small amounts of urea.

The polyvinyl fluoride used in making the dispersions of this invention is most conveniently prepared by polymerizing the monomer in aqueous systems according to known methods, such as those described in U. S. Patents 2,419,008, 2,419,010 and 2,510,783. Particularly useful polymerization initiators are the water-soluble azo compounds of U. S. Patents 2,599,299 and 2,599,300, since they make it possible to obtain the polymer directly as an aqueous dispersion of very fine or colloidal particles.

The coalescible polyvinyl fluoride dispersions of this invention can be prepared by stirring an aqueous polyvinyl fluoride dispersion, obtained by any suitable method, with an appropriate amount of a water-soluble or water-miscible latent solvent. The stirring should be vigorous enough to insure mixing of all ingredients and to assist in peptization of the clusters. Conventional high speed stirring or blending equipment, such as the Waring-Blendor and commercial colloid mills are adequate for this purpose. With certain latent solvents which appear to be inherently active in clustering the polymer particles, such as tetramethylurea, clustering (immobilizing) of the polymer particles will take place without addition of an auxiliary coagulant. With most latent solvents, however, it is necessary for proper immobilization of the particles to add to the mixture, prior to, simultaneously with, or subsequently to the addition of the latent solvent, a small amount of an auxiliary coagulant such as the electrolytes already mentioned. Stirring is continued at least until all ingredients are added. Whether or not the desired immobilization of the particles has been achieved can be tested by examining a drop of the dispersion in a dark field microscope. If satisfactory immobilization of the particles has been accomplished, the dispersion will be seen to contain independent clusters in which the primary particles show no visible Brownian motion. Thus, it is possible to determine whether the degree of stirring was adequate and/or whether an auxiliary clustering agent is necessary. As a general rule, if clustering is not obtained within three minutes of stirring with a Waring-Blendor, the use of an auxiliary coagulant is necessary.

The coalescible polyvinyl fluoride dispersions of this invention are the starting materials for preparing shaped polyvinyl fluoride structures, such as films or filaments, characterized by good homogeneity, clarity, durability, toughness and ability to be drawn. These articles are made by shaping the dispersion, e. g., by casting it on a substrate by use of a doctor knife or by extruding it through a slot onto a casting roll or through a spinneret onto a support, then subjecting it to an elevated temperature, normally above 100° C. and preferably, between 125° C. and 200° C. During this heat treatment, water and any volatile non-solvent is removed and the polymer particles are subjected to the action of an increasing concentration of latent solvent at a temperature at which the latter is an effective solvent.

Although the precise mechanism of coalescence that ensues upon heating the shaped dispersion is not fully understood, it is probable that segments of polymer molecules on the surface of particles become mobilized by solvent action and entangle with segments similarly mobilized on neighboring particles. Unless the particles themselves have been previously immobilized, their Brownian motion interferes with this coalescence mechanism. As the heating is continued, the latent solvent evaporates, leaving the polyvinyl fluoride as a coalesced, homogeneous shaped structure essentially free from latent solvent and any other liquid phase of the original dispersion, and having the desirable properties mentioned above. It is preferred that the rate of heating of the coalescing film be as fast as practical without boiling. This serves to bring the temperature of the polymer clusters up while there is still solvent present. Slow evaporation at 100° C. to 125° C., for example, may result, in some instances, in incomplete coalescence. The entire process is actually very rapid with films or filaments in the usual range of thickness or denier. It is usually completed within a period of 3 to 20 minutes, the final stage being recognizable by the change from an opaque to a transparent structure, or by the attainment of maximum tensile or tear strength of the film.

The heat-coalescence of the dispersions is conveniently done in air, particularly when films are being prepared. With filaments, the same method can be used by extruding the dispersion through a spinneret onto a support moving in a heated zone.

The following examples wherein all proportions are by weight unless otherwise stated, illustrate specific embodiments of the invention.

*Example I*

An aqueous polyvinyl fluoride dispersion was prepared by heating in an agitated pressure vessel water containing 0.039% of alpha,alpha'-azodiisobuytramidine hydrochloride (also called 2,2'-diguanyl-2,2'-azopropane dihydrochloride; see U. S. Patents 2,599,299 and 2,599,300) as the polymerization initiator at 70–90° C. under a pressure of vinyl fluoride of about 30 atmospheres. No dispersing agent was used. The polymerization was interrupted when the liquid phase contained about 18% solids. There was obtained a fluid dispersion containing discrete particles of polyvinyl fluoride of approximately 0.2 micron average diameter. The polymer had an inherent viscosity in 0.25% concentration in dimethylacetamide at 125° C. of about 0.74.

To 75 parts of this 18% polymer dispersion stirred in a high speed mixer was added 75 parts of tetramethylurea, a water-soluble latent solvent for polyvinyl fluoride. The resulting slightly thixotropic dispersion was degassed by stirring it slowly with alternating evacuation, then admission of air, until the tendency for bubbles to rise during the evacuation phase of the cycle was substantially eliminated. Light scattering measurements showed that the resulting dispersion consisted preponderantly of clusters ranging from 0.6 to 4 (mostly 1.4) microns in diameter, each cluster comprising many primary particles of the initial aqueous dispersion, suspended in the medium (tetramethylurea and water).

This dispersion was cast by means of a doctor knife set at 10 mil clearance onto a thin chromium-plated steel plate. The coated plate was placed in an oven at 150° C. for about 10 minutes, by which time substantially complete evaporation of water and tetramethylurea with resulting clarification had taken place. There resulted a tough, clear, thin film of polyvinyl fluoride, which could readily be stripped from the plate after cooling, or alternatively would spontaneously strip by quenching the hot plate in water. The film was of high optical quality.

In comparison, when the initial aqueous dispersion without treatment with tetramethylurea was similarly cast on a metal plate and heated at 150° C. until evaporation of the water was completed, the dispersion did not stay spread out but retracted into ridges near the middle and coalesced only to a partial degree to give rough, brittle fragments of no value.

*Example II*

To 100 parts of the initial 18% aqueous polyvinyl fluoride dispersion of Example I was added with stirring 100 parts of diacetone alcohol, a water-miscible latent solvent for polyvinyl fluoride. There was no apparent viscosity change except for thinning due to dilution with the diacetone alcohol. At this stage there was substantially no clustering of the particles, and a sample of the dispersion did not yield a coherent film upon being cast and heated as in Example I. Five parts of ammonium acetate was then added to the dispersion with stirring. An increase in viscosity took place, followed by peptization as stirring continued. It is probable that, during this treatment, coagulation of the polyvinyl fluoride particles occurred, followed by break-up to clusters. Light scattering measurements showed that the dispersion consisted of clusters, ranging from 1 to 10 (mostly 2 to 3) microns in diameter, of polymer particles. This dispersion was cast, coalesced and quenched as in Example I to yield a clear, tough, thin film of polyvinyl fluoride.

*Example III*

An aqueous dispersion of polyvinyl fluoride of 20.5% solids content was prepared by heating at 70° C. in an agitated bomb water containing 0.1% of alpha,alpha'-azodiisobutyramidine hydrochloride under a polyvinyl fluoride pressure of 230–250 atmospheres. To 75 parts of this dispersion was added 75 parts of tetramethylurea in a high speed mixer, the blending taking 5 minutes. The resulting dispersion of polyvinyl fluoride particle clusters was degassed, flowed on a metal plate with a doctor knife at 30 mil clearance, and the plate was heated in an oven at 190° C. for 12 minutes. There resulted a clear film of 3 mil thickness having a tensile strength of 4600 lb./sq. in., and capable of being cold drawn to 2.5 times its original dimensions.

*Example IV*

An aqueous polyvinyl fluoride dispersion was prepared as in Example III, except that it had a solids content of 26.1%. This dispersion was divided into five portions of 25 parts each. Each portion was mixed in a high speed blender with, respectively, 5, 10, 15, 20 and 25 parts of dimethylacetamide, and to each mixture was added 0.1 part of ammonium carbonate. Thus, these dispersions of clustered polyvinyl fluoride particles contained the following amounts of dimethylacetamide based on the polyvinyl fluoride present:

| | Percent |
|---|---|
| Dispersion 1 | 77 |
| Dispersion 2 | 154 |
| Dispersion 3 | 230 |
| Dispersion 4 | 307 |
| Dispersion 5 | 386 |

Each dispersion was cast into a film as described in Example III. Dispersion 1 gave a poor film, lacking in coherence and uniformity. Dispersion 2 gave a coherent and strong film, but hazy. The film from dispersion 3 was better, but still somewhat deficient in clarity. Dispersion 4 gave a clear, strong film and dispersion 5 gave a clear, brilliant film of excellent quality.

*Example V*

An autoclave was charged with 0.15 part of alpha,alpha' - azobis(alpha-methylisobutyramidine)hydrochloride, 145 parts of water and 135 parts of vinyl fluoride gas, and heated with stirring to 70° C. in 55 minutes, at which time the pressure was about 1600 lb./sq. in. The temperature was held at 69–73° C. for an additional 6¾ hours while the pressure was maintained at 1500–1600 lb./sq. in. by intermittent pressuring with vinyl fluoride. After cooling to 32° C. (pressure 510 lb./sq. in.) the excess vinyl fluoride was bled off. There was obtained an aqueous polyvinyl fluoride dispersion containing 19.9% solids. The polymer particles were substantially uniform in size and were found, by angular dependence light-scattering measurements, to have an average diameter of approximately 0.2 to 0.4 micron. When this dispersion was spread as a thin coating on a thin metal sheet and heated to 190° C.–200° C., a film was not obtained.

To 40 parts of this dispersion was added 40 parts of dimethylacetamide in a blending mixer. The resulting aqueous-organic dispersion was again found to consist preponderantly of non-clustered particles of average diameter 0.2 to 0.4 micron, and it was not film-forming on casting and heating at 190° C.–200° C. Addition of one-half part of a saturated aqueous solution of ammonium carbonate to 80 parts of this dispersion with continued stirring caused the polymer particles to form into clusters of about 7 micron average diameter. The clustered dispersion, cast at a thickness of 45 mils on a thin metal plate, then heated to 190° C.–200° C. yielded a tough, clear film whose tensile strength was further increased by cold drawing.

*Example VI*

To 20 parts of the 18% aqueous polyvinyl fluoride dispersion of Example I was added with stirring 20 parts of triethyl phosphate, then 0.5 part of a 10% aqueous solution of ammonium acetate. Stirring was then discontinued and, after the rise of bubbles had dissipated, the resulting dispersion of clustered polyvinyl fluoride particles was cast at 10 mil thickness on a 20 mil chromium-plated steel plate. This plate was placed in an oven at 160° C. for 5 minutes, immersed in cold water, and a clear, tough polyvinyl fluoride film was stripped therefrom.

*Example VII*

To 200 parts of the 18% aqueous polyvinyl fluoride dispersion of Example I was added 100 parts of butadiene cyclic sulfone (2,5-dihydrothiophene-1,1-dioxide) and the mixture was ball-milled in a jar half full of ⅜ inch diameter glass beads for 2 hours. The resulting dispersion of clustered polyvinyl fluoride was cast and coalesced as in Example VI to yield a tough, clear film.

It will be understood the above examples are merely illustrative and that the present invention broadly comprises an aqueous polyvinyl fluoride dispersion essentially comprising clusters of polyvinyl fluoride particles, the average diameter of the clusters being at least twice the average diameter of the primary particles, dispersed in an aqueous liquid medium, containing at least 100%, by weight of the polyvinyl fluoride, of a water-soluble organic liquid which is a non-solvent for polyvinyl fluoride below 100° C. but a solvent therefor at higher temperatures, the organic liquid being present in amount at least equal to one-half the weight of the water.

Preferably, the dispersions of this invention contain from 5% to 30%, and still more preferably, from 8% to 20%, of polyvinyl fluoride based on the weight of the total dispersion.

As has been shown, these compositions can be prepared directly by stirring the latent solvent plus auxiliary coagulant, if any, with the initial aqueous polymer dispersion until clustering occurs. These aqueous-organic systems give better results as regards quality of the ultimate polyvinyl fluoride structure when the latent solvent is soluble in water to the extent of at least 1 part in 2 parts of water, and the best results are had when the latent solvent is miscible with water in all proportions.

There are a large number of water-soluble organic liquids suitable for use as the latent solvent in the dispersions of this invention, i. e., organic liquids which have no appreciable solvent action for polyvinyl fluoride at temperatures below about 100° C. but show solvent action for it at higher temperatures. These include methylformamide, dimethylformamide, methylacetamide, dimethylacetamide, dimethylhydroxyacetamide, diacetone alcohol, acetonyl acetone, tetramethylurea, cyclic ethylene carbonate, pyridine, triethyl phosphate, bis(methoxymethyl)uron, N,N - dimethyllactamide, N,N - dimethylmethoxyacetamide, N,N-dimethyl-γ-hydroxybutyramide, and butadiene cyclic sulfone.

The latent solvents are sharply differentiated from non-solvents such as aliphatic hydrocarbons, xylene, chloroform, carbon tetrachloride, acetic acid, acetone, and ethanol which do not dissolve polyvinyl fluoride even at elevated temperatures. The latent solvents are relatively volatile since, in general, their boiling point is between 100° C. and 300° C. at atmospheric pressure and preferably between 125° C. and 200° C. At least they can be substantially removed by heating at 200° C. or less for 20 minutes.

The aqueous-organic dispersions are most easily handled when they contain, based on the total weight of the dispersion, from 5% to 30%, preferably from 8% to 20%, of polyvinyl fluoride, from 20% to 60% of latent solvent and from 30% to 60% of water, with the further proviso that the weight ratio of latent solvent to polyvinyl fluoride is between 1:1 and 12:1, preferably between 3:1 and 6:1, and the weight ratio of latent solvent to water is between 0.5:1 and 1.5:1.

As already stated, it is preferred that these aqueous-organic systems contain a small amount of an electrolyte, as this facilitates agglutination of the polymer particles into clusters.

Thus, the best results are obtained with aqueous dispersions comprising from 8% to 20% of polyvinyl fluoride based on the weight of the total dispersion, latent solvent in amount equivalent to 3 to 6 times the weight of polyvinyl fluoride and 0.5 to 1.5 times the weight of the water, and 0.1 to 3%, by weight of the total composition, of an ammonium or alkali metal salt of an acid of dissociation constant above about $1 \times 10^{-7}$.

The best results from the standpoint of film formation and film qualities have been obtained with tetramethylurea as the latent solvent. Thus, a specially preferred embodiment of the invention is that in which the dispersions have the composition described above and in which the latent solvent is tetramethylurea.

While this invention has been described with reference to polyvinyl fluoride, it should be understood that it is also applicable to vinyl fluoride copolymers containing a minor proportion, up to 5% by weight, of another, copolymerized monomer, and in which copolymers the essential dispersion characteristics of polyvinyl fluoride itself are not substantially modified.

The process of forming polyvinyl fluoride structures from the dispersions of this invention is susceptible of variations, but broadly it comprises forming the dispersion into a shaped structure and heating the latter at a temperature and for a time sufficient to evaporate the water, cause the latent solvent to exert solvent action on the polymer and evaporate the latent solvent. In practice, these three effects can take place simultaneously. For example, in some cases it is a mixture of latent solvent with water which exerts a solvent action on the polymer. For the preparation of films, a convenient method is to expose the aqueous-organic dispersion to temperatures between about 125° C. and 200° C., which accomplishes evaporation of water, coalescence of the clusters and evaporation of the organic solvent. In most cases, the latent solvent is substantially completely removed from the shaped structure by heating. In some cases, however, it is desirable to leave a minor portion of the latent solvent in the shaped structure. This can be done by discontinuing the heating at some predetermined point after coalescence but before the latent solvent is completely evaporated. Alternatively, the initial latent solvent may contain a minor proportion of a non-volatile latent solvent, which is left in the shaped structure after the volatile latent solvent is evaporated. Suitable equipment for the recovery of the organic solvent is used in large scale operations. For the preparation of filaments, the aqueous-organic dispersions can be extruded into heated air chambers, with suitable collecting equipment such as moving belts or rotating wheels.

The dispersions of this invention will ordinarily be made from the aqueous dispersions of polyvinyl fluoride obtained by polymerizing monomeric vinyl fluoride in aqueous systems, as previously mentioned. It is important that such starting dispersions contain a minimum of flocculated or aggregated polyvinyl fluoride which will not resolve into primary particles early in the preparation of the latent solvent-containing dispersions of this invention. These aggregates of polymer are quite distinct from the characteristic clusters of the instant dispersions. The undesirable aggregates are composed of particles having their interfaces apparently partly fused together and their behaviour is entirely different from the clusters of primary particles whose interfaces are separated by thin layers of latent solvent.

The aggregates of polyvinyl fluoride cause trouble in that they tend to carry over substantially unchanged to the latent solvent-containing dispersion and do not furnish primary particles for the formation of the clusters necessary in the dispersions of this invention. Light microscope examination of an aqueous polymer dispersion readily reveals the presence of any undesirable aggregates. If a dispersion containing a large proportion of such aggregates is used inadvertently, the addition of a latent solvent, and even of an electrolyte, will not cause as large a rise in viscosity as when a dispersion substantially free of such aggregates is used. Further, the sedimentation volume of the final dispersion will be less than the 90% to 100% of an acceptable dispersion according to the present invention.

A casting of dispersions containing unwanted aggregates of polymer tends to retract on the substrate during heating and to yield a substantially useless, monocoalesced powder due to the escape of latent solvent at high temperature without effecting coalescence, in contrast to the highly useful, fully coalesced clear film obtained when using the dispersions of this invention. This behaviour can be predicted by examination of the dispersion by means of a light microscope, particularly with paraboloid condenser dark-field viewing. A drop of the noncoalescible dispersion, under a cover glass, will show some particles in Brownian motion as well as compact aggregates sharply separated from each other by fluid, some of which aggregates are moving in the medium. On the other hand, the coalescible dispersions of this invention show substantially no motion because of immobilization of both medium and clusters, and more diffuse boundaries between clusters, the entire field appearing relatively homogeneous until closely inspected.

This invention lends itself to use in a convenient and economical method of making polyvinyl fluoride articles of excellent quality directly from aqueous polyvinyl fluoride dispersions. Polyvinyl fluoride, as is known, has many desirable properties which make it an outstanding material for film and filament uses.

As many apparently widely different embodiments of this invention may be made without departing from the spirit and scope thereof, it is to be understood that the invention is not limited to the specific embodiments thereof except as defined in the appended claims.

The invention claimed is:

1. A dispersion of clusters of polyvinyl fluoride particles, the average diameter of said clusters being at least twice the average diameter of the primary particles and in the approximate range of 0.4 to 20 microns, in an aqueous liquid medium containing latent solvent means to coalesce said polyvinyl fluoride particles at temperatures above 100° C. into a coherent homogeneous structure upon removal of the aqueous liquid medium, said latent solvent means being further characterized by being an organic liquid having a boiling point between 100° C. and 300° C. and a solubility of at least 1 part in 2 parts of water, said organic liquid being a non-solvent for polyvinyl fluoride below 100° C. but a solvent therefor at higher temperatures, said dispersion essentially comprising, by weight, 5% to 30% of said polyvinyl fluoride, 20% to 60% of said organic liquid, and 30% to 60% of water, the amount of said organic liquid being 1 to 12 times the weight of said polyvinyl fluoride and 0.5 to 1.5 times the weight of water.

2. A dispersion as set forth in claim 1 wherein said organic liquid is present in an amount equal to 3 to 6 times by weight of said polyvinyl fluoride and said polyvinyl fluoride amounts to 8% to 20% by weight of said dispersion.

3. A dispersion as set forth in claim 1 containing 0.01% to 3%, by weight of said dispersion, of an electrolyte from the group consisting of ammonium and alkali metal salts of an acid having a dissociation constant above $1 \times 10^{-7}$.

4. A dispersion as set forth in claim 1 wherein the average diameter of said clusters of polyvinyl fluoride particles is in the range of 1 to 10 microns, the average diameter of the primary particles is in the range of 0.1 to 0.2 microns, and said clusters contain an average of at least 6 primary particles per cluster.

5. A dispersion as set forth in claim 4 containing 0.01% to 3%, by weight of said dispersion, of an electrolyte from the group consisting of ammonium and alkali metal salts of an acid having a dissociation constant above $1 \times 10^{-7}$.

6. A dispersion as set forth in claim 1 wherein said water-soluble organic liquid is tetramethylurea.

7. A dispersion as set forth in claim 1 wherein said water-soluble organic liquid is diacetone alcohol.

8. A dispersion as set forth in claim 1 wherein said water-soluble organic liquid is dimethylacetamide.

9. A dispersion as set forth in claim 1 wherein said water-soluble organic liquid is triethylphosphate.

10. A dispersion as set forth in claim 1 wherein said water-soluble organic liquid is butadiene cyclic sulfone.

References Cited in the file of this patent

UNITED STATES PATENTS

| | | |
|---|---|---|
| 2,510,783 | Johnston et al. | June 6, 1950 |
| 2,600,681 | Park et al. | June 17, 1952 |